United States Patent
Held

(12) United States Patent (10) Patent No.: US 6,530,865 B2
Held (45) Date of Patent: Mar. 11, 2003

(54) DOUBLE TAPERED ARTICLE

(75) Inventor: Richard A. Held, Sun City West, AZ (US)

(73) Assignee: Gill Athletics, Inc., Urbana, IL (US)

( * ) Notice: Subject to any disclaimer, the term of this patent is extended or adjusted under 35 U.S.C. 154(b) by 10 days.

(21) Appl. No.: 09/812,933

(22) Filed: Mar. 20, 2001

(65) Prior Publication Data

US 2002/0136847 A1 Sep. 26, 2002

(51) Int. Cl.[7] .............................................. A63B 65/00
(52) U.S. Cl. ........................ 482/20; 428/35.7; 428/413; 264/313; 249/179; 249/183; 273/317; 473/578
(58) Field of Search .......................... 264/313; 249/179, 249/183; 156/86; 428/413, 35.7; 425/DIG. 44

(56) References Cited

U.S. PATENT DOCUMENTS

| | | | | |
|---|---|---|---|---|
| 4,404,053 A | * | 9/1983 | Saffire ......................... | 156/86 |
| 5,262,121 A | * | 11/1993 | Goodno ....................... | 264/571 |
| 5,534,203 A | * | 7/1996 | Nelson et al. .............. | 264/101 |

* cited by examiner

*Primary Examiner*—Robert Dawson
*Assistant Examiner*—Christopher M. Keehan
(74) *Attorney, Agent, or Firm*—Cook, Alex, McFarron, Manzo, Cummings & Mehler, Ltd.

(57) ABSTRACT

A method of forming a molded article and a molded article itself having a passage therein which has a cross-sectional dimension adjacent an end which is less than at a location which is spaced from the end are disclosed. In the method an elongate, rigid mandrel is covered over a substantial portion of its length with a flexible mandrel. The flexible mandrel, when covering the rigid mandrel, has an exterior surface which has a cross-sectional dimension which is less adjacent an end thereof than at a location which is spaced from that end. The flexible mandrel is then covered with a material which is to form the molded article with the rigid and flexible mandrels defining the mold about which the article is formed by the material. The material is then set to form the molded article about the mandrels with the mandrels defining the passage in the molded article. The mandrels are then removed from the molded article from the end of the passage which has a cross-sectional dimension which is less than at the location which is spaced from that end.

29 Claims, 2 Drawing Sheets

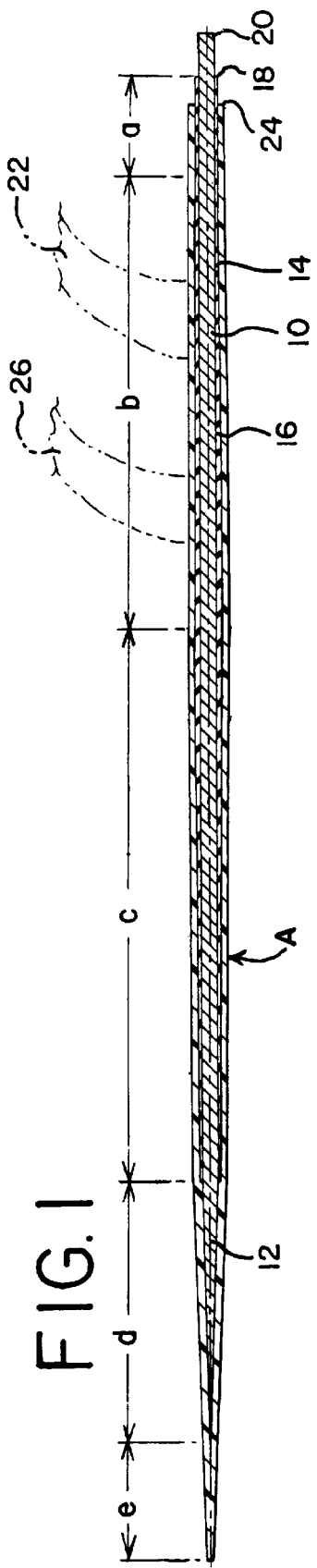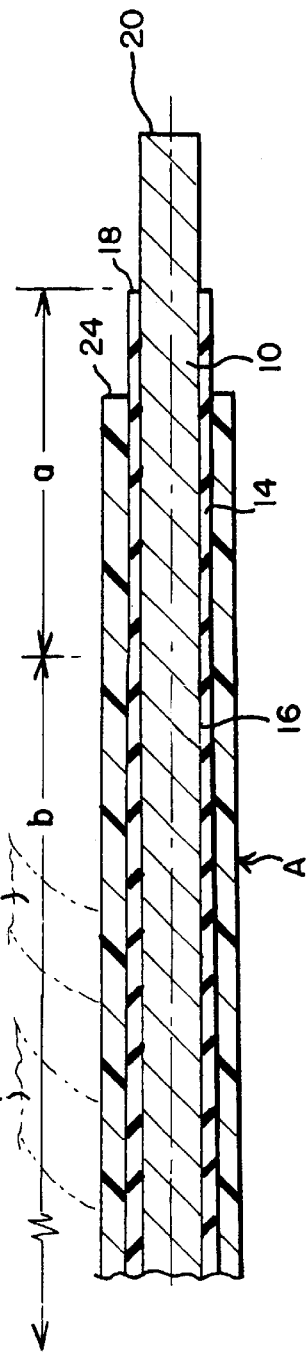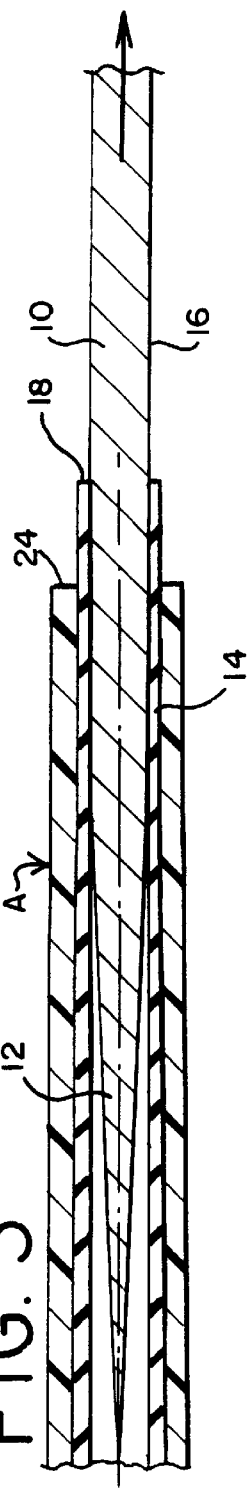

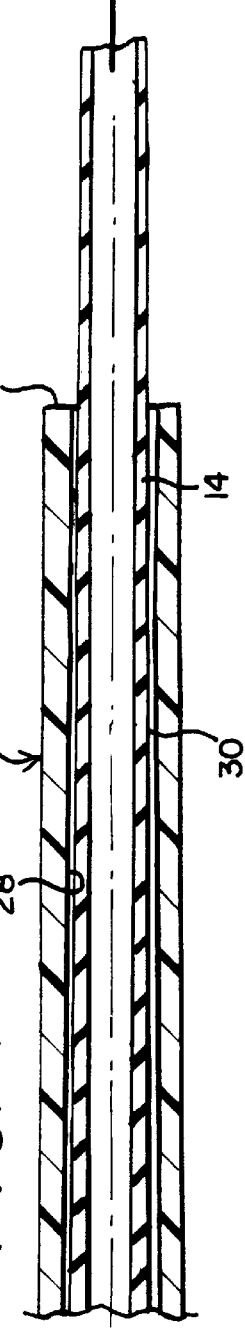
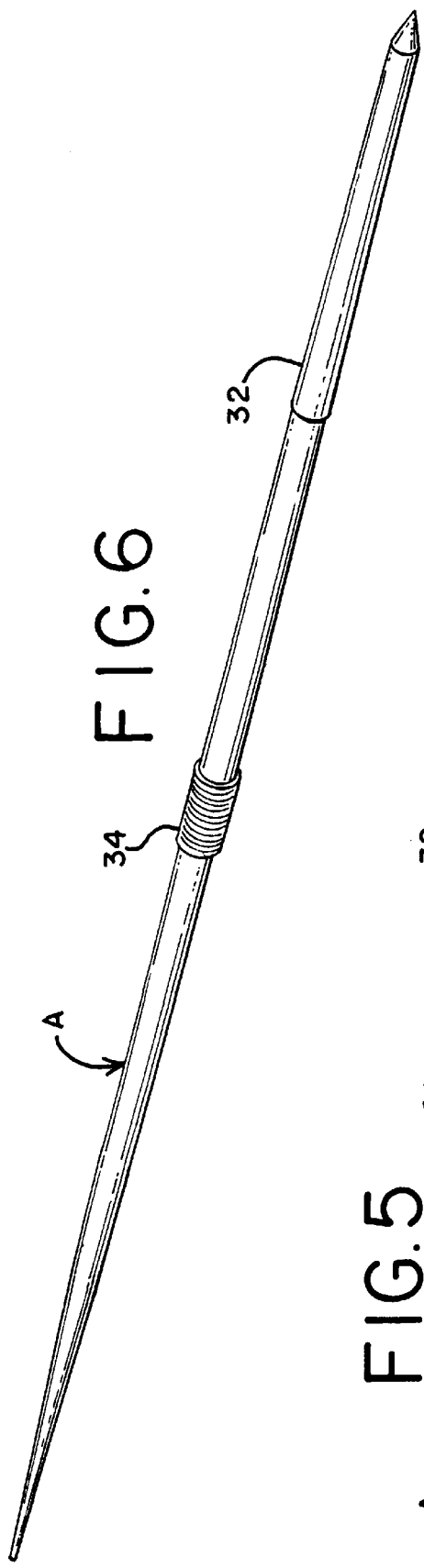
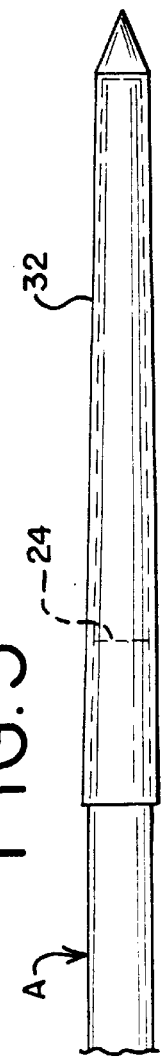
FIG. 4
FIG. 6
FIG. 5

DOUBLE TAPERED ARTICLE

BACKGROUND AND SUMMARY OF THE INVENTION

The present invention relates to a method of forming a molded article and, more particularly, to a method of forming and a molded article having a passage therein which has a cross-sectional dimension adjacent an end which is less than at a location which is spaced from that end.

Double tapered articles are known in which the cross-sectional dimension of the article, e.g. the diameter, decreases toward each of the ends. These are typically articles of metal or other materials which are formed by grinding or sanding the ends of a rod to define the decreasing cross-sectional dimension and/or by compressing or swaging a tube toward one or both of its ends to form at least one and sometimes opposite tapered ends. Such compressing or swaging of tubing is, for example, disclosed in my U.S. Pat. No. 3,274,816.

In certain circumstances it would be advantageous to form an elongate one piece shaft by the molding of a composite polymeric material about a mold and in which the mold, and hence the passage in the shaft which remains after the removal of the mold, has a double taper, e.g. is tapered toward each end. However, this previously has not been possible because it was not possible to remove the mold about which the shaft was formed once the polymeric material used to form the shaft has been set or cured. This is because the cross-sectional dimensions at the tapered ends of the passage which is formed by the mold are smaller than in between the ends and, therefore, block the movement of the mold, which has a larger cross-sectional dimension between its ends, out of the passage. Such shafts of varying internal cross-sectional dimensions would be highly desirable, for example, in a javelin where the cross-sectional dimensions of both the interior and exterior of the shaft desirably vary over the length of the javelin for proper weight, balance and flexing qualities.

This problem has been solved in the present invention. The present invention makes it possible to form a one piece, molded, polymeric shaft having a passage therethrough which is formed by the mold, and which varies in cross-sectional dimension over its length so that these dimensions are less at the ends of the shaft than at a location spaced from the ends. Yet the mold about which the shaft has been formed is capable of easy removal from such shaft passage after the article has been formed and set.

In one principal aspect of the present invention, a method of forming a molded article having a passage therein which has a cross-sectional dimension adjacent an end which is less than at a location which is spaced from such end, comprises providing an elongate substantially rigid mandrel having a substantially rigid surface thereon and which surface has a given shape, and covering a substantial portion of the rigid surface of the rigid mandrel with a flexible mandrel. The flexible mandrel has an inner surface which assumes the shape of the rigid surface of the rigid mandrel when the flexible mandrel is positioned thereon, and an exterior surface on the flexible mandrel which has a cross-sectional dimension which is less adjacent an end thereof than at a location which is spaced from the end. The flexible mandrel is covered with a material which is to form the molded article, with the rigid and flexible mandrels defining a mold about which the molded article is formed by the material. The material is set to form the molded article about the mandrels with the mandrels defining the passage in the molded article, and the mandrels are removed from the molded article from the end of the passage which has the cross-sectional dimension which is less than at the location which is spaced from such end.

In another principal aspect of the present invention, the rigid mandrel is removed from the passage first and then the flexible mandrel is removed from the passage.

In still another principal aspect of the present invention, the rigid mandrel is metal.

In still another principal aspect of the present invention, the rigid mandrel is an elongate solid rod.

In still another principal aspect of the present invention, the rigid mandrel is elongate and of uniform cross-sectional dimension over a major portion of its length, and is preferably cylindrical.

In still another principal aspect of the present invention, the flexible mandrel stretches when it is being removed from the passage in the molded article.

In still another principal aspect of the present invention, the flexible mandrel is formed of silicone rubber.

In still another principal aspect of the present invention, the flexible mandrel is a sleeve which is pulled over the rigid mandrel to cover its rigid surface.

In still another principal aspect of the present invention, the flexible mandrel has a high thermal coefficient of expansion so that it exerts a pressure on the wall of the passage and the rigid surface of the rigid mandrel during the setting of the material.

In still another principal aspect of the present invention, the material is heated during setting.

In still another principal aspect of the present invention, the material is constrained on the side thereof opposite the mandrels during setting.

In still another principal aspect of the present invention, the material is constrained by wrapping with a tight stretch film.

In still another principal aspect of the present invention, the material includes an epoxy resin.

In still another principal aspect of the invention, the method is for molding the shaft of a javelin.

In still another principal aspect of the present invention, an article of manufacture comprises a molded elongate single piece shaft formed of a polymeric material with the shaft having first and second ends. A passage opens to the first end and extends from the first end toward the second end and over a substantial portion of the length of the elongate shaft. The passage is formed from and defined by the mold upon which the shaft is molded and after the mold is removed, and the passage has a cross-sectional dimension which is less at the first and second ends than between the ends.

In still another principal aspect of the present invention, the shaft also has an external surface having a cross-sectional dimension which is less at the first and second ends than between the ends.

In still another principal aspect of the present invention, the polymeric material includes an epoxy resin.

In still another principal aspect of the present invention, the polymeric material comprises a fabric selected from the group consisting essentially of fiberglass, carbon fibers, ceramic fibers and mixtures thereof which is impregnated with an epoxy resin.

In still another principal aspect of the present invention, the shaft is the shaft of a javelin.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a cross-sectioned side elevation view of a double tapered shaft, such as a javelin shaft, being formed by the preferred method of the present invention;

FIG. 2 is a broken, enlarged side elevational cross-sectioned view of the right end of the shaft as seen in FIG. 1, and with rigid and flexible mandrels in the position that they assume during molding as in the preferred method of the present invention;

FIG. 3 is a view similar to FIG. 2, but showing the rigid mandrel being removed following the molding process;

FIG. 4 is a view similar to FIG. 3, but showing the flexible mandrel being removed after the rigid mandrel has been removed;

FIG. 5 is an enlarged, broken side elevation view of the shaft of FIG. 1 after the mandrels have been removed and with a javelin tip installed on the right end of the shaft; and FIG. 6 is a perspective view of a completed javelin formed from the shaft of the present invention and with a javelin tip and hand grip positioned thereon.

DETAILED DESCRIPTION OF THE PREFERRED EMBODIMENTS

A preferred embodiment of method of forming a molded article and the molded article itself in the form of a javelin constructed in accordance with the principles of the present invention are shown in the drawings.

As seen in FIGS. 1 and 2, a pair of mandrels are provided to form a mold about which the molded article of the invention is formed. An inner rigid mandrel 10 comprises an elongate rod of generally uniform cross-sectional dimension over a major portion of its length. The rigid mandrel 10 is preferably formed of metal, is solid and is cylindrical over a major portion of its length, except for a tail portion 12 which tapers over a portion of its length as seen in FIGS. 1 and 3. Where the rigid mandrel is a solid rod, the tapered tail may be formed by grinding. In the alternative, the rigid mandrel 10 may be formed of a tube in which case the tapered tail may be formed by swaging as described in my aforementioned patent.

The metal of the rigid mandrel 10 is preferably aluminum or steel of either the stainless or carbon variety. After forming a new rigid mandrel 10 it is preferably seasoned by coating its exterior rigid surface 16 with melted paraffin which is allowed to solidify. The mandrel is then heated again until the coating melts and drips from the rigid mandrel and the surface is then wiped dry with a soft cloth while still hot and polished after coating. After this initial seasoning and prior to use, the rigid mandrel 10 is waxed with a suitable wax. These treatments permit easy removal of the rigid mandrel after the molding of the article.

The second mandrel of the mold is a flexible mandrel 14 which is formed of a flexible, stretchable material, such as silicone rubber. The material of the flexible mandrel preferably has a high thermal coefficient of expansion so that when it is heated, it tends to expand somewhat to exert a pressure on the rigid surface 16 of the rigid mandrel 10 and the inner surface of the article which is to be formed by the molding process during the setting of the material of the article as will be described in further detail later. An example of a suitable silicon rubber with such coefficient of expansion is SE 875 with catalyst available from General Electric.

The flexible mandrel 14 takes the form of a tubular sleeve which in use is slid over the rigid surface 16 of the rigid mandrel 10 until the end 18 of the flexible mandrel is located slightly short of the end 20 of the rigid mandrel. This permits a small portion of the length of the rigid mandrel 10 to be exposed adjacent its end 20 beyond the end 18 of the flexible mandrel, as seen in FIGS. 1 and 2, so that the rigid mandrel may be grasped to remove it from the molded article and the flexible mandrel 14 after molding. The flexible mandrel 14 preferably has a length which is the sum of the lengths of sections a+b+c as shown in FIG. 1. The external diameter of the flexible mandrel 14 over the length of section a is preferably uniform and does not vary. The external diameter of the flexible mandrel 14 over the length of section b does vary in accordance with the invention so that its external cross-sectional dimension or diameter adjacent section a is less than its cross-sectional external dimension or diameter adjacent the right end of section c as viewed in FIG. 1. Conversely, the external cross-sectional dimension or diameter of the flexible mandrel 14 then preferably decreases over the length of section c, as viewed in FIG. 1, so that its external cross-sectional dimension or diameter adjacent the left end of section b is greater than it is adjacent the right end of section d, as viewed in FIG. 1. At this point the flexible mandrel 14 is terminated leaving just the tapered tail 12 of the rigid mandrel 10 to be exposed over the length of section d. The internal cross-sectional dimension or diameter of the flexible mandrel 14 tubular sleeve is preferably substantially constant over the length of sections a, b and c because the rigid mandrel 10 is substantially cylindrical and, therefore, constant in those sections.

The increasing cross-sectional dimension or diameter of the flexible mandrel 14 over section b and the decreasing cross-sectional dimension or diameter over section c is an important feature of the invention because it achieves a principal part of the double taper of the molded article of the invention.

The varying tapered sections and cross-sectional dimensions or diameters of the flexible mandrel 14 may be achieved either by molding the flexible mandrel with these varying dimensions or by sliding a sleeve of the flexible mandrel material over the rigid mandrel 10 and then sanding or grinding down the exterior surface of the sleeve toward the ends of the sleeve to achieve the varying cross-sectional dimension or diameter.

In order to form the double tapered molded article A of the invention, the flexible mandrel 14 is first assembled upon the rigid mandrel 10 by slipping it over the conditioned and waxed rigid surface 16 of the rigid mandrel until the end 18 of the flexible mandrel assumes the position spaced slightly from the end 20 of the rigid mandrel 10 as seen in FIGS. 1 and 2.

In preferred form once the flexible mandrel 14 is positioned upon the rigid mandrel 10, it will cover and conform to the rigid surface 16 of the rigid mandrel, will extend over the lengths of sections a, b and c as shown in FIG. 1, and will terminate before the beginning of section d. Only the tapered tail 12 of the rigid mandrel 10 will be present and exposed over the length of section d. Finally, there will be no mandrel over the length of section e, as shown in FIG. 1.

Assembly of the molded article A may now be commenced. This is typically done by wrapping a pre-impregnated cloth or tape material 22, as depicted in dot and dash in FIGS. 1 and 2, back and forth over the length of the mandrels. However, the impregnated cloth wrapping is preferably terminated at 24 just short of the right end 18 of the flexible mandrel 14 as viewed in FIGS. 1 and 2 to permit the exposure of a short portion of the length of the flexible mandrel to facilitate its removal once the molding operation is completed.

The impregnated cloth or tape 22 is preferably impregnated with a thermosetting resin, and most preferably an epoxy resin which may be cured by heat. The tape itself may be woven or be fibers of fiberglass, carbon or ceramic in the form of a fabric. Suitable examples of preimpregnated fiberglass cloth or tape include MXB7409/1557 or MXB7409/7576, and of preimpregnated unidirectional carbon fiber tape include HYE949b, all available from Cytec Fiberite, Inc. Each of these has a cure temperature of 250° F.

When the wrapping of the resin impregnated cloth or tape 22 has been completed, it will cover and conform to the exterior surface of the flexible mandrel 14 over the length of section a (except for the small unwrapped portion between the end 18 of the flexible mandrel and the end 24 of the wrap), the entire length of the increasing cross-sectional dimension exterior surface in section b; the entire length of the decreasing cross-sectional dimension exterior surface in section c; over the rigid surface 16 of the tapered tail 12 of the rigid mandrel 10; and over the length of the short section e where the impregnated cloth 22 is only wrapped upon itself without the support of any mandrel.

The article thus far assembled is then wrapped preferably with a tight stretch film wrapping 26 over its length, and as depicted in dot and dash in FIGS. 1 and 2. The stretch film wrap 26 constrains the resin impregnated cloth 22 during setting and curing. Because the flexible mandrel 14 is formed of a material which has a high thermal coefficient of expansion and the surface 16 of the rigid mandrel 10 itself is rigid, pressure will be exerted upon the inner surface of the resin impregnated cloth 22 during curing. Although a tight stretch film wrapping is preferred, other forms of external constraint also may be employed, such as a pressurized external bladder or bag or a two piece female mold clamped in place under pressure over the wrapped resin impregnated tape or cloth 22 to apply external pressure during curing. It will also be appreciated that depending upon the form of exterior constraint which is employed, resins in other more fluid or flowable forms than impregnated into fabrics or tapes may be applied to the mandrels and then cured to form the molded article A of the invention.

The entire assembly, as thus far described, is now heated to a temperature sufficient to cure the resin in the resin impregnated cloth 22. Once the resin has been cured and set and cools, the rigid mandrel 10 may be easily removed from the flexible mandrel 14, as seen in FIG. 3, through the opening which is formed in the end 24 of the article A. Removal of the rigid mandrel 10 is simplified because it is of a uniform cross-sectional dimension over most of its length. Where it is not of uniform cross-sectional dimension at its tapered tail 12, its cross-sectional dimension is diminishing which does not impede removal.

Once the rigid mandrel 10 has been removed, the flexible mandrel 14 may now relax slightly away from the inner wall 28 of the passage 30 which has been formed by the mandrels during the molding process, as seen in FIG. 4. Furthermore, when the flexible mandrel 14 is pulled to remove it from the passage 30 in the direction of the arrow as seen in FIG. 4, it may further stretch somewhat which also tends to reduce its cross-sectional dimension or diameter to further simplify the removal of the flexible mandrel from the opening in the end 24 of the article A. Thus, it will be seen that the removal of the flexible mandrel 14 may be easily performed even though the diameter or cross-sectional dimension of the opening and the passage 30 is less at the end 24 than at a location to the left of the end 24 of the passage 30 as viewed in FIG. 4.

Although the flexible mandrel 14 may relax somewhat away from the inner wall 28 of passage 30 when the rigid mandrel 10 is removed and/or when it is pulled to remove it, it preferably retains sufficient body to generally maintain its original shape and does not just collapse.

As previously mentioned, one such article A which may be molded in accordance with the principles of the present invention, is the shaft of a javelin which is tapered toward each end of the shaft. The method of the present invention makes it possible to form a javelin shaft of a one piece composite polymeric material by molding which was not heretofore possible.

Once the shaft has been completed, in order to complete the javelin, the tail tip of the shaft at the left end of section e, as viewed in FIG. 1, is preferably cut off to form the tail of the javelin, and the right end 24 is trimmed as necessary to remove any ragged edges. A hollow javelin point 32 of steel or aluminum is then press fit onto the tapering end 24 of the javelin shaft A, and a hand grip 34 preferably of wrapped cotton cord, is formed intermediate the ends of the javelin and at approximately the center of gravity of the javelin.

The method of forming the molded composite polymeric one piece article of the present invention is particularly advantageous in the making of a javelin shaft. This is because the competition specifications of a javelin are quite rigid and the double tapers, their sizing and location are advantageously considered in the weight and balance of the javelin, its mass and ability to flex.

It will be understood that the embodiments of the present invention which have been described are merely illustrative of a few of the applications of the principles of the invention. Numerous modifications may be made by those skilled in the art without departing from the true spirit and scope of the invention.

I claim:

1. A method of forming a molded article having a passage therein which has a cross-sectional dimension adjacent an end which is less than at a location which is spaced from such end, comprising:

providing an elongate substantially rigid mandrel having a substantially rigid surface thereon and which surface has a given shape;

covering a substantial portion of said rigid surface of said rigid mandrel with a flexible mandrel, said flexible mandrel having an inner surface which assumes the shape of said rigid surface of said rigid mandrel when said flexible mandrel is positioned thereon, and an exterior surface on said flexible mandrel which has a cross-sectional dimension which is less adjacent an end thereof than at a location which is spaced from said end;

covering said flexible mandrel with a material which is to form the molded article, said rigid and flexible mandrels defining a mold about which said molded article is formed by the material;

setting said material to form the molded article about said mandrels with said mandrels defining said passage in the molded article; and removing said elongate substantially rigid mandrel having said substantially rigid surface of given shape from the molded article from the end of said passage which has said cross-sectional dimension which is less than at the location which is spaced from such end.

2. The method of claim 1, wherein said rigid mandrel is removed from said passage first and then said flexible mandrel is removed from said passage.

3. The method of claim 1, wherein said rigid mandrel is metal.

4. The method of claim 1, wherein said rigid mandrel is an elongate solid rod.

5. The method of claim 1, wherein said rigid mandrel is elongate and of uniform cross-sectional dimension over a major portion of its length.

6. The method of claim 5, wherein said rigid mandrel is cylindrical over said major portion of its length.

7. The method of claim 1, wherein said rigid mandrel is an elongate solid metal, cylindrical rod which is of uniform cross-sectional dimension over a major portion of its length.

8. The method of claim 2, wherein said rigid mandrel is an elongate solid metal, cylindrical rod which is of uniform cross-sectional dimension over a major portion of its length.

9. The method of claim 1, wherein said flexible mandrel stretches when it is being removed from said passage in said molded article.

10. The method of claim 1, wherein said flexible mandrel is formed of silicone rubber.

11. The method of claim 1, wherein said flexible mandrel is a sleeve which is pulled over said rigid mandrel to cover said rigid surface.

12. The method of claim 1, wherein said flexible mandrel has a high thermal coefficient of expansion so that it exerts a pressure on the wall of said passage and said rigid surface of said rigid mandrel during the setting of said material.

13. The method of claim 1, wherein said flexible mandrel is a sleeve which is pulled over said rigid mandrel to cover its surface, is formed of a silicone rubber which stretches when said flexible mandrel is being removed from said passage in said molded article, and has a high thermal coefficient of expansion so that it exerts a pressure on the wall of said passage and said rigid surface of said rigid mandrel during the setting of said material.

14. The method of claim 7, wherein said flexible mandrel is a sleeve which is pulled over said rigid mandrel to cover its surface, is formed of a silicone rubber which stretches when said flexible mandrel is being removed from said passage in said molded article, and has a high thermal coefficient of expansion so that it exerts a pressure on the wall of said passage and said rigid surface of said rigid mandrel during the setting of said material.

15. The method of claim 8, wherein said flexible mandrel is a sleeve which is pulled over said rigid mandrel to cover its surface, is formed of a silicone rubber which stretches when said flexible mandrel is being removed from said passage in said molded article, and has a high thermal coefficient of expansion so that it exerts a pressure on the wall of said passage and said rigid surface of said rigid mandrel during the setting of said material.

16. The method of claim 1, wherein said material is heated during setting.

17. The method of claim 16, wherein said flexible mandrel has a high thermal coefficient of expansion so that it exerts a pressure on the wall of said passage and said rigid surface of said rigid mandrel when heated during the setting of said material.

18. The method of claim 1, including constraining the material on the side thereof opposite said mandrels during setting.

19. The method of claim 18, wherein the material is constrained by wrapping with a tight stretch film.

20. The method of claim 1, wherein said material includes an epoxy resin.

21. The method of claim 1, wherein said material includes an epoxy resin which is heated during setting, and the material is constrained on the side thereof opposite said mandrels during setting.

22. The method of claim 1, wherein said molded article is a shaft which has said passage therein, and the cross-sectional dimensions at both ends of the passage are less than between the ends.

23. The method of claim 22, wherein said shaft is the shaft of a javelin.

24. The method of claim 1, wherein said molded article is the shaft of a javelin.

25. A javelin comprising:
a molded elongate single piece javelin shaft formed of a polymeric material, said shaft having first and second ends; and
a passage opening to said first end and extending from said first end toward said second end and over a substantial portion of the length of said elongate javelin shaft, said passage being formed from and defined by the mold upon which said shaft is molded and after the mold is removed, and said passage having a cross-sectional dimension which is less at said first and second ends than between said ends.

26. The javelin of claim 25, wherein said shaft an external surface having a cross-sectional dimension less at said first and second ends than between said ends.

27. The javelin of claim 25, wherein said polymeric material includes an epoxy resin.

28. The javelin of claim 25, wherein said polymeric material comprises a fabric selected from the group consisting essentially of fiberglass, carbon fibers, ceramic fibers and mixtures thereof which is impregnated with an epoxy resin.

29. The article of claim 25, wherein said shaft is the shaft of a javelin.

* * * * *